US012767417B2

(12) United States Patent
Gimelstein et al.

(10) Patent No.: US 12,767,417 B2
(45) Date of Patent: Oct. 20, 2026

(54) BOTTLE HAVING INTERNAL MIXING COMPARTMENT

(71) Applicants: Josh Gimelstein, Boca Raton, FL (US); Scott Acker, Miami, FL (US)

(72) Inventors: Josh Gimelstein, Boca Raton, FL (US); Scott Acker, Miami, FL (US)

( * ) Notice: Subject to any disclaimer, the term of this patent is extended or adjusted under 35 U.S.C. 154(b) by 610 days.

(21) Appl. No.: 18/099,941

(22) Filed: Jan. 21, 2023

(65) Prior Publication Data

US 2023/0234769 A1 Jul. 27, 2023

Related U.S. Application Data

(60) Provisional application No. 63/266,978, filed on Jan. 21, 2022.

(51) Int. Cl.

| | |
|---|---|
| ***B01F 33/501*** | (2022.01) |
| ***B01F 23/50*** | (2022.01) |
| ***B01F 33/25*** | (2022.01) |
| ***B65D 1/04*** | (2006.01) |
| ***B65D 23/04*** | (2006.01) |
| ***B65D 81/32*** | (2006.01) |
| *B01F 101/14* | (2022.01) |

(52) U.S. Cl.

CPC .......... *B65D 81/3222* (2013.01); *B01F 23/50* (2022.01); *B01F 33/25* (2022.01); *B01F 33/50111* (2022.01); *B65D 1/04* (2013.01); *B65D 23/04* (2013.01); *B01F 2101/14* (2022.01)

(58) Field of Classification Search

CPC ................................................ B01F 33/50111
USPC .................................. 366/130; 422/275–277
See application file for complete search history.

(56) References Cited

U.S. PATENT DOCUMENTS

| | | | | |
|---|---|---|---|---|
| 30,053 A * | 9/1860 | Drott | B01F 33/5011 | 366/130 |
| 58,165 A * | 9/1866 | Dreunan | B01F 33/5011 | 366/130 |
| 187,893 A * | 2/1877 | Oliver | A47J 31/20 | 99/289 R |
| 193,894 A * | 8/1877 | Rice | A47J 31/4403 | 99/317 |
| 4,003,555 A * | 1/1977 | Swartz | A47J 43/27 | D7/300.1 |

(Continued)

*Primary Examiner* — David L Sorkin

(74) *Attorney, Agent, or Firm* — Allen F. Bennett; Bennett Intellectual Property

(57) ABSTRACT

A portable bottle having an internal mixing compartment for mixing a powder with a liquid includes a portable drinking bottle housing a mixing compartment. The mixing compartment is formed from a rigid perforated material and extends upward into the drinking bottle from its base. The mixing compartment is accessible through an opening in the base of the bottle, and houses one or more agitators. In use, a particulate material is inserted into the mixing compartment chamber with the agitator and liquid is then added to the bottle. The bottle having an internal mixing compartment is shaken to dissolve the soluble components of the particulate material. The liquid is poured or consumed through the top of the bottle. Insoluble constituents of the particulate material are prevented from exiting the drinking bottle through the top. The agitator facilitates efficient dissolution of the soluble components of the particulate material.

9 Claims, 6 Drawing Sheets

(56) References Cited

U.S. PATENT DOCUMENTS

| | | | | | |
|---|---|---|---|---|---|
| 4,105,412 | A * | 8/1978 | Petzinger | C05F 17/986 | 220/23.9 |
| 6,379,032 | B1 * | 4/2002 | Sorensen | B01F 33/251 | 366/342 |
| 8,424,448 | B2 | 4/2013 | Englert et al. | | |
| 10,517,421 | B2 | 12/2019 | Habram | | |
| 2013/0279287 | A1 * | 10/2013 | Cerasani | B01F 33/50111 | 366/130 |
| 2014/0242240 | A1 * | 8/2014 | Billadeau | A47J 31/005 | 99/287 |
| 2014/0367318 | A1 | 12/2014 | Ayres et al. | | |

* cited by examiner

Fig. 3
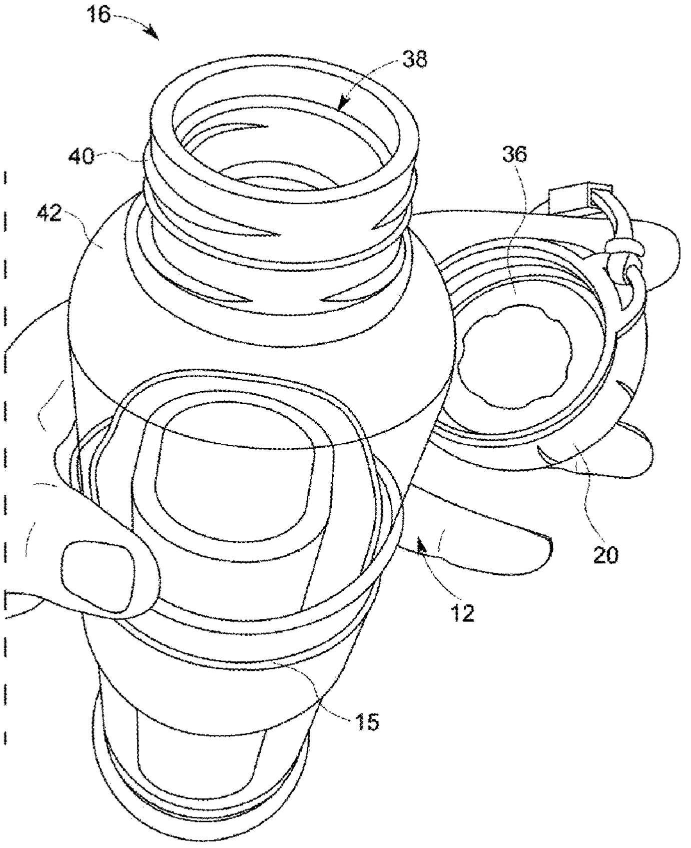
Fig. 4
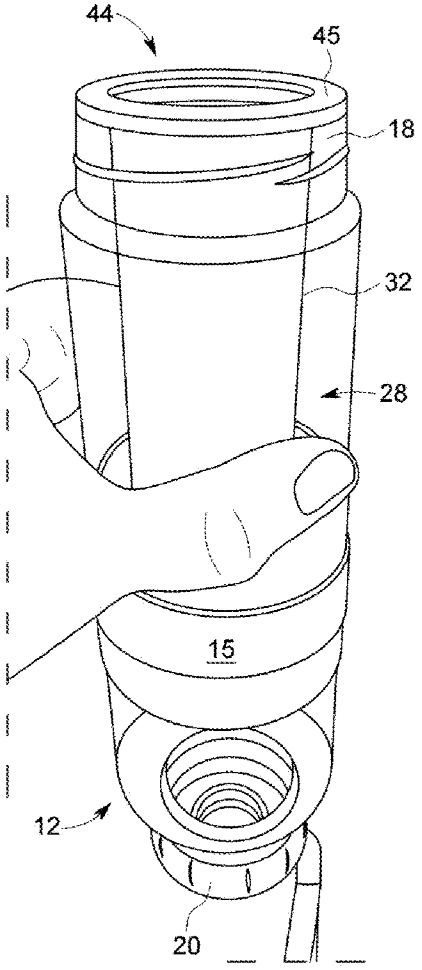
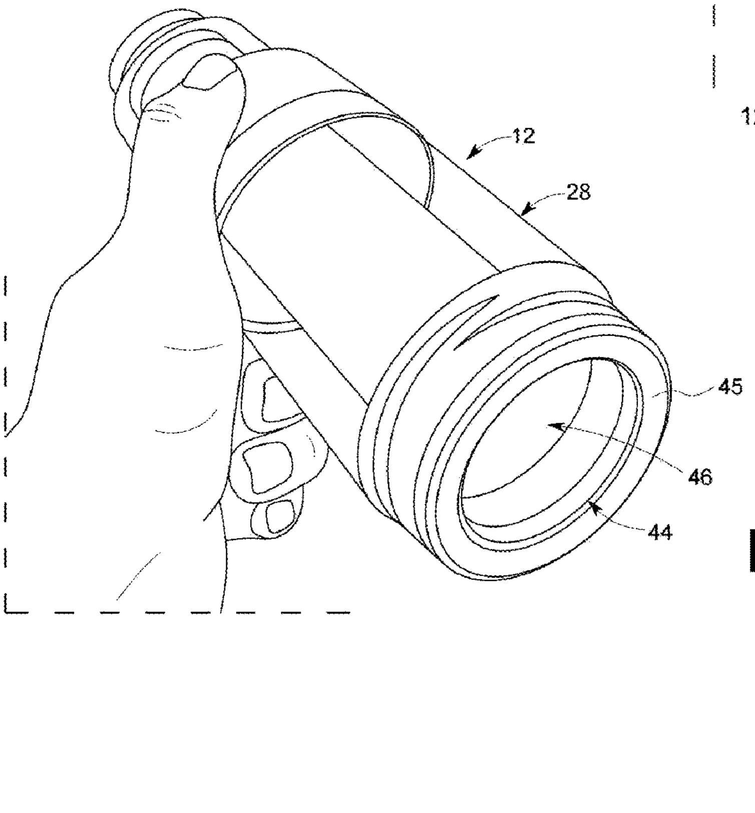
Fig. 5

BOTTLE HAVING INTERNAL MIXING COMPARTMENT

CROSS-REFERENCE TO RELATED APPLICATIONS

The application claims priority to U.S. Provisional Application Ser. No. 63/266,978 filed on Jan. 21, 2022.

BACKGROUND OF THE INVENTION

Field of the Invention

The present invention relates to a bottle having an internal mixing compartment. More particularly, the invention relates to a bottle having an internal mixing compartment containing a mixing ball.

Description of the Related Art

The use of hand-held, portable bottles continues to increase in popularity. Such bottles are often sold containing water or other beverages. It is also become increasingly popular for persons to utilize portable bottles during exercise or while conducting various athletic activities. A wide variety of powders, teas and other products are sold which are mixed into water within a portable bottle. In the past, a spoon, mixing straw or similar item was used to mix powders or syrups into water. This is less practical with a portable bottle because the openings in the tops tend to be small.

A wide variety of solutions have been devised to assist in mixing a powder with water in a portable bottle quickly and easily. Lids containing a powder may be screwed onto a bottle and then actuated to puncture a membrane, thereby releasing powder into the water. The bottle is then shaken by the operator to dissolve the power.

For teas, coffee and the like, which include a substantial amount of insoluble material, adding the particulate material directly to the water within a portable bottle is undesirable. This is because the undissolved tea leaves, coffee grinds, etc., are not separated, and will float out of the bottle along with the liquid. This results in the undesirable effect of tea leaves and coffee grinds entering a user's mouth. One solution is to use a tea bag which is water permeable that holds the undissolved solid matter within the bag. However, when using the portable bottle, the teabag itself can flow toward the bottle's exit, blocking the opening or causing the teabag to fall into the user's mouth. Small agitators, often spherical in shape, are also available for containing particulate matter within a container of liquid, but they suffer from the same disadvantages as tea bags.

Teabags retain the solid components within a pouch and prevent them from dispersing throughout a liquid. However, dissolution of the soluble components within the teabag is imperfect at best and relies in large part on osmosis. As a result, a user often must remove the teabag and physically squeeze out liquid, then reinserted into the liquid in order to promote effective dissolution. Devices such as coffee pots may be used by lining the teabags flat in the upper chamber of a coffee pot to ensure the hot water passes through the teabag, maximizing osmosis. However, this substantially complicates the process.

For larger containers such as teapots and coffee pots, more elaborate devices are available to separate the solids from the liquid. Coffee pots can come in the form of percolators which prevent the coffee grounds for mixing with the liquid.

Teapots include interior chambers that hold the leaves but are also water permeable. A French tea press is an example. Another common example is a teapot with a steel mixing compartment. Neither of these designs are usually secured closed, nor are they designed to be shaken.

A wide variety of reusable bottles are used by persons to mix and drink protein shakes and similar beverages. Some of these bottles include a plurality of radially extending arms near the top of the bottle to assist in mixing the power with the liquid. Another common device is an agitator such as a "mixing ball." A mixing ball is typically a ball formed from an open spherical frame that may or may not have a smaller ball or other structure within. Mixing bowls are inserted into a bottle with water and a powder. When the bottle is shaken vigorously, the physical action of the mixing ball assists in mixing and dissolving the powder into the water. This type of mixing ball agitator is generally used with powders that dissolve fully into the liquid and are generally not used with materials that do not completely dissolve.

In the health and exercise fields, it has become commonplace to use drinking bottles with internal free floating agitators to mix protein powder into water or milk. However, whey protein, the most common form of protein powder, often forms floating clumps that are take time to dissolve, even when very effective agitators are used. As a result, when a person takes a drink from the bottle, these floating clumps are the first to exit the bottle and are generally unpleasant to consume.

The above-described deficiencies of today's systems are merely intended to provide an overview of some of the problems of conventional systems, and are not intended to be exhaustive. Other problems with the state of the art and corresponding benefits of some of the various non-limiting embodiments may become further apparent upon review of the following detailed description.

In view of the foregoing, it is desirable to provide improved devices and methods for affectively dissolving solid materials into a liquid, with or without the presence of insoluble solids, in a highly portable container or bottle and which prevents solid materials and partially dissolved clumps from approaching the opening through which the liquid is dispensed.

BRIEF SUMMARY OF THE INVENTION

Disclosed is a portable bottle having an internal mixing compartment for mixing a powder and a liquid comprising a drinking bottle defined by a bottle sidewall extending from a base to a top. A mixing compartment is located within the drinking bottle and includes a mixing compartment sidewall extending from a mixing compartment top to an opening in the base of the bottle. The opening may include an annular lip and connects the mixing compartment sidewall to the base of the drinking bottle. Both the mixing compartment top and mixing compartment sidewall are formed from a perforated, rigid material such as a rigid screen mesh. A removable top lid covers and forms a watertight seal over an opening in the top of the bottle when the top lid is affixed to the top of the drinking bottle. A removable bottom lid covers and forms a watertight seal over the opening in the base of the drinking bottle. A mixing compartment chamber is defined by the mixing compartment sidewall, the mixing compartment top and the bottom lid. The mixing compartment chamber is only accessible through the annular lip connected to the base of the drinking bottle. At least one removable agitator is placed within the internal mixing compartment.

In additional embodiments, the annular lip may be detachable from the base of the bottle and the mixing compartment may also optionally be removable from the drinking bottle. The drinking bottle and the mixing compartment may also both be substantially cylindrical and coaxially aligned about a longitudinal axis. The agitator may be a free floating agitator. The width of the at least one agitator may be substantially equal to or less than a width of the mixing compartment. The top of the bottle may comprise a cylindrical neck extending upward from a convex shoulder, and the cylindrical neck may be less wide than the mixing compartment. The annular lip around the opening in the base of the drinking bottle may or may not prevent the agitator from exiting the mixing compartment chamber. The agitator may comprise a spherical frame surrounding an internal weighted sphere, or may be ellipsoidal. The agitator may be sized to fit through the annular lip and is removable from the mixing compartment chamber.

In another embodiment, a method of mixing a powder and a liquid within a portable drinking bottle comprises several steps. First, a drinking bottle defined by a bottle sidewall extending from a base to a top, a mixing compartment housed within the drinking bottle comprising a mixing compartment sidewall extending from a mixing compartment top to an annular lip, wherein the annular lip defines an opening in the base of the drinking bottle and connects the mixing compartment sidewall to the base of the drinking bottle, and wherein the mixing compartment is formed from a perforated, rigid material, a removable bottle top lid covering and forming a watertight seal over an opening in the top of the bottle when the top lid is affixed to the top of the drinking bottle, a removable bottom lid covering and forming a watertight seal over the opening in the base of the drinking bottle, a mixing compartment chamber defined by the mixing compartment sidewall, the mixing compartment top and the bottom lid, wherein the mixing compartment chamber is only accessible through the annular lip connected to the rim of the opening in the base of the drinking bottle, and at least one removable agitator within the internal mixing compartment is provided.

Next, a particulate material is added into the mixing compartment chamber by inverting the drinking bottle, removing the bottom lid and pouring the particulate matter into the mixing compartment chamber. A liquid is then added to the bottle having an internal mixing compartment. Finally, the bottle having an internal mixing compartment is manually vigorously shaken.

In alternative embodiments, The liquid is added by pouring the liquid through the opening in the base of the bottle having an internal mixing compartment such that it passes through the mixing compartment chamber. The maximum width of the agitator may be substantially equal to the width of the mixing chamber. The annular lip around the opening in the base of the drinking bottle may prevent the agitator from exiting the mixing compartment chamber. The method may also further comprise reattaching the bottom lid to the bottle having an internal mixing compartment after particulate material is added, then un-inverting the bottle having an internal mixing compartment, removing the top lid, adding a liquid to the bottle having an internal mixing compartment through the opening in the top of the bottle having an internal mixing compartment, and reattaching the top lid. The method may also further comprises removing the at least one agitator prior to adding the particulate matter and reinserting the at least one agitator after depositing the particulate matter. A plurality of agitators having ellipsoidal shapes may also be used.

It is therefore an object of the present invention to provide an improved bottle having an internal mixing compartment for mixing a particulate matter with a liquid in a portable bottle.

These and other objects and advantages of the present invention will become apparent from a reading of the attached specification and appended claims. There has thus been outlined, rather broadly, the more important features of the invention in order that the detailed description thereof that follows may be better understood, and in order that the present contribution to the art may be better appreciated. There are features of the invention that will be described hereinafter and which will form the subject matter of the claims appended hereto.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 3 is a top perspective view of a bottle having an internal mixing compartment with a top lid removed in accordance with the principles of the invention;

FIG. 4 is a side view of an inverted bottle having an internal mixing compartment with the bottom lid removed in accordance with principles of the invention;

FIG. 5 is a perspective view of a bottle having an internal mixing compartment with the bottom lid removed in accordance with the principles of the invention;

DETAILED DESCRIPTION

Figure 1:
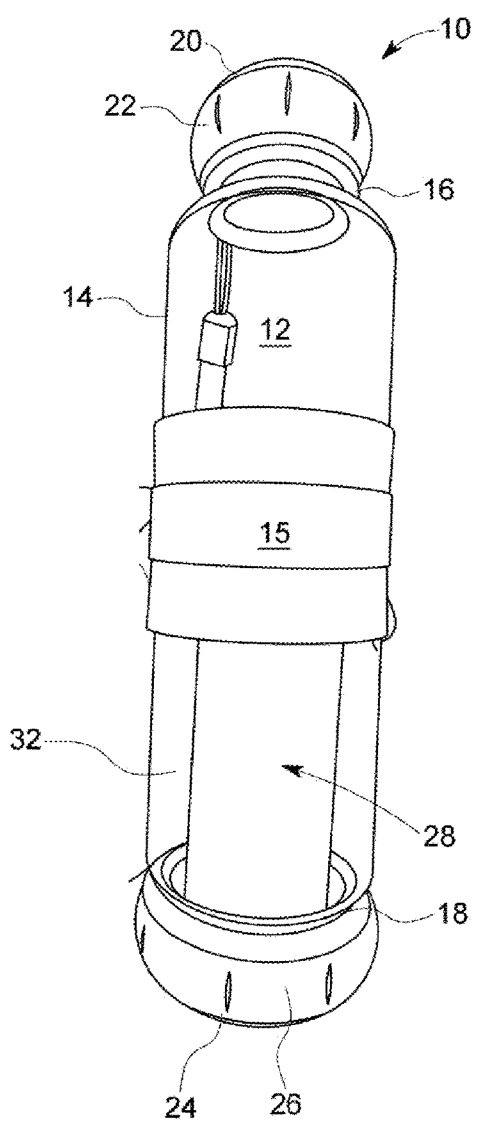
FIG. 1 is a side elevation view of a bottle having an internal mixing compartment in accordance with the principles of the invention.
Figure 2:
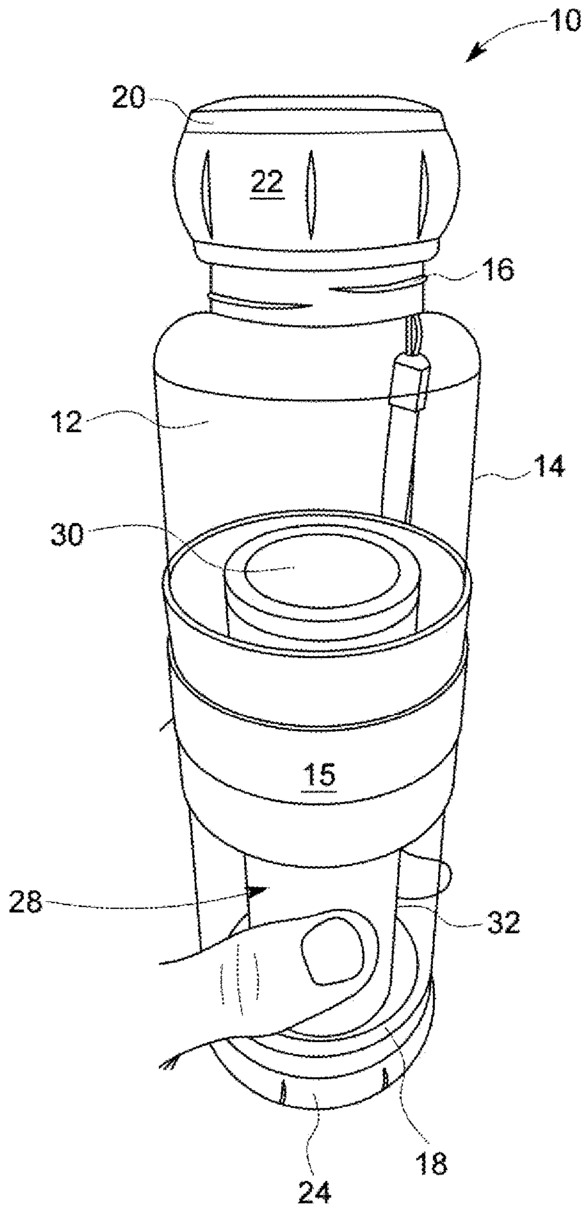
FIG. 2 is a perspective side view of a bottle having an internal mixing compartment in accordance with the principles of the invention.

The invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter may be practiced without these specific details. In other instances, well-known structures and devices are shown in block diagram form in order to facilitate describing the various embodiments herein. Various embodiments of the disclosure could also include permutations of the various elements recited in the claims as if each dependent claim was a multiple dependent claim incorporating the limitations of each of the preceding dependent claims as well as the independent claims. Such permutations are expressly within the scope of this disclosure.

Unless otherwise indicated, all numbers expressing quantities of ingredients, dimensions, reaction conditions and so forth used in the specification and claims are to be understood as being modified in all instances by the term “about”. The term “a” or “an” as used herein means “at least one” unless specified otherwise. In this specification and the claims, the use of the singular includes the plural unless specifically stated otherwise. In addition, use of “or” means “and/or” unless stated otherwise. Moreover, the use of the term “including”, as well as other forms, such as “includes” and “included”, is not limiting. Also, terms such as “element” or “component” encompass both elements and components comprising one unit and elements and components that comprise more than one unit unless specifically stated otherwise. The terms “width” and “diameter” are used throughout interchangeably unless the context clearly indicates otherwise. Various components of the invention are shown as cylindrical or spherical in some exemplary embodiments, and in such case the width is equal to the diameter. However, it should be understood that the invention may be practiced with components that are not cylindrical or spherical, in which case the term “diameter” should be understood to mean “width” or “maximum width.” “Portable” as used herein generally refers to a bottle that that is suitable for use by an operator during, and may be held or stored by the operator during, running, biking, hiking, kayaking, exercising in a gym, or other situations where an operator preferably drinks from the bottle having an internal mixing compartment directly instead of pouring the contents of the bottle having an internal mixing compartment into an ancillary container.

Various embodiments of the disclosure could also include permutations of the various elements recited in the claims as if each dependent claim was a multiple dependent claim incorporating the limitations of each of the preceding dependent claims as well as the independent claims. That is, the combinations of the various components of the invention are not limited to those combinations expressly shown in the Figures. Unless expressly stated otherwise, components described in one embodiment may be interchanged with components of the same name found in other embodiments. Such permutations are expressly within the scope of this disclosure.

Disclosed is a bottle having an internal mixing compartment for mixing a powder and a liquid which includes a typically sized drinking bottle having an internal mixing compartment accessible through the bottom of the bottle and which contains one or more agitators, which are preferably free-floating. The devices disclosed herein are self-contained and secure, having no external moving parts. They allow an operator to dissolve solid materials into a liquid affectively by simply shaking the bottle while also preventing any free-floating particulate matter from mixing with the liquid to be consumed by the operator. Liquid is consumed directly from the bottle such that it is inverted when in use. As a result, any liquid remaining inside the mixing compartment drains automatically as the liquid is consumed.

FIGS. 1-7 show an exemplary embodiment of a bottle having an internal mixing compartment for mixing a powder and a liquid. The bottle having an internal mixing compartment 10 includes a drinking bottle 12 having a solid, continuous sidewall 14 that extends from a top 16 to a base 18. The drinking bottle 12 has a diameter and cross-sectional area defined by the sidewall 14. In this embodiment, the sidewall 14 is formed from a transparent plastic material and includes an optional cuff 15 around the center of the sidewall 14. The cuff 15 is made of an elastomeric or other nonslip material to assistant operator in tightly and securely grasping the bottle during use. The cuff 15 may optionally be removable and/or adjustable along the length of the drinking bottle 12. Typically however, the cuff 15 is positioned in the middle of the bottle 10 to facilitate firm gripping at approximately the center of gravity for full bottle being shaken.

A removable top lid 20 is removably attachable to the top 16 of the bottle 12 and forms a watertight seal when attached. In this embodiment, the top lid 20 also includes an annular gripping surface 22 similar to the cuff 15, in order to allow the top lid 20 to be detached and reattached more easily. Those skilled in the art will appreciate that the inside of the top lid 20 may include a gasket to facilitate watertight sealing between the lid 20 and the bottle 12. In this embodiment, the lid 20 engages the top 16 of the bottle 12 by means of threading and is screwed on and off. Those skilled in the art will appreciate the numerous other removable attachment mechanisms such as a friction fit, bayonet lock or the like may also be suitable. A bottom lid 24 removably attaches to the base 18 and a similar manner by which the lid 20 attaches to the top 16. That is, it forms a watertight seal and may be removed and attached by screwing and unscrewing or other mechanisms. The bottom lid 24 similarly includes an annular gripping surface 26. Those skilled in the art will appreciate that the lids 20 and 24 may include a gasket or other component to facilitate watertight sealing of the lids to the bottle.

An internal mixing compartment 28 extends from the base 18 of the bottle 12 upward to a point about half way between the mixing compartment top 16 and the base 18 of the drinking bottle 12. The top 30 of the internal mixing compartment 28 in this embodiment is circular but may optionally be hemispherical. Both the mixing compartment's top 30 and the mixing compartment's sidewall 32 are formed from a permeable rigid material. This material may be a mesh screen of a desired gauge, or may simply be a solid material that has been perforated. The sidewall 32 in top 30 of the mixing compartment allow liquid to freely pass across them, but prevent particulate matter of a given size or larger from passing through. In this embodiment, the drinking bottle 12 in the mixing compartment 28 are substantially cylindrical and coaxial. Those skilled in the art will appreciate that different geometric shapes may be used, but the cylindrical and coaxial design shown in FIGS. 1-7. The mesh screen prevents clumps of material from exiting the mixing compartment 28 while still allowing them to be agitated and further dissolved by additional shaking of the bottle even after the liquid has been partially consumed. This minimizes waste of the solid material and maximizes dissolution of the solid material into the liquid. Because any clumps of solid material remain in the mixing compartment with an agitator, an operator may optionally add more liquid after the original liquid is consumed, to further dissolve the remaining clumped solid material.

FIG. 3 shows the top lid 20 removed so that the gasket 36 and top opening 38 are visible. In this embodiment, the top 16 of the drinking bottle 12 has a cylindrical neck 40 extending upward from an annular, convex shoulder 42 of the drinking bottle 12. The opening 38 and the cylindrical neck 40 thus both have smaller diameters and cross-sectional areas than the drinking bottle 12. Similarly, the opening 38 and the cylindrical neck 40 have smaller width, i.e. diameters, than The top lid 30 similarly has a smaller diameter than that of the drinking bottle 12, which allows an operator to better grasp the top lid 30 when removing or attaching it. This configuration also makes the bottle having an internal mixing compartment more suitable for portable uses, such as when running, biking, hiking, kayaking, exercising in a gym, or other situations where an operator preferably drinks from the bottle having an internal mixing compartment directly instead of pouring the contents of the bottle having an internal mixing compartment into an ancillary container. This portability is one desirable advantage of the present invention. A narrow neck 40 and narrow opening 30 allows an operator to easily insert the neck into his or her mouth while drinking, preventing spilling while performing athletic activities.

Figure 6:
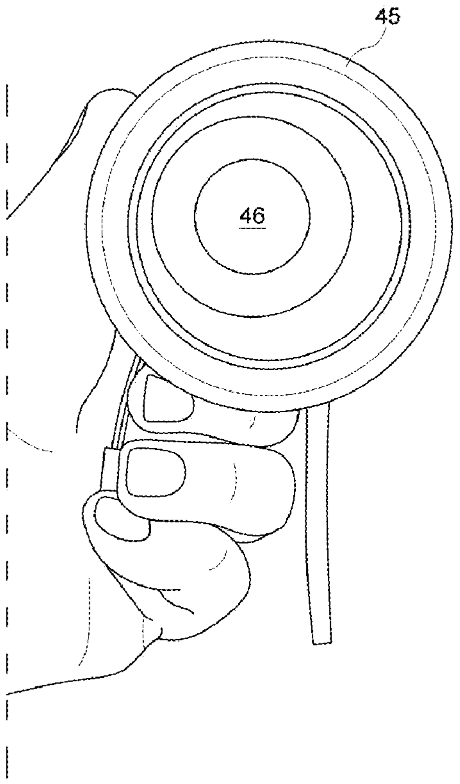
FIG. 6 is a bottom plan view of a bottle having an internal mixing compartment with the bottom lid removed in accordance with the principles of the invention.

FIGS. 4-6 show the drinking bottle 12 with the bottom lid 24 removed, revealing the base opening 44 defined by an annular lip 45 which connects the base 18 of the drinking bottle 12 to the mixing compartment sidewall 32. Only the mixing compartment chamber 46 is accessible through the base opening 44. Any materials introduced through the base opening 44 will enter the mixing compartment chamber 46 defined by the mixing compartment top 30 and the mixing compartment sidewall 32. In this embodiment, the annular lip 45 is detachable from the base 18 of the drinking bottle, allowing the mixing compartment 28 to be completely removed from inside the drinking bottle 12. This allows both the drinking bottle 12 and the mixing compartment 28 to be cleaned more easily than if the mixing compartment 28 were not removable. Optionally, the annular lip 45 may be permanently attached to the drinking bottle's base 18.

Figure 7:
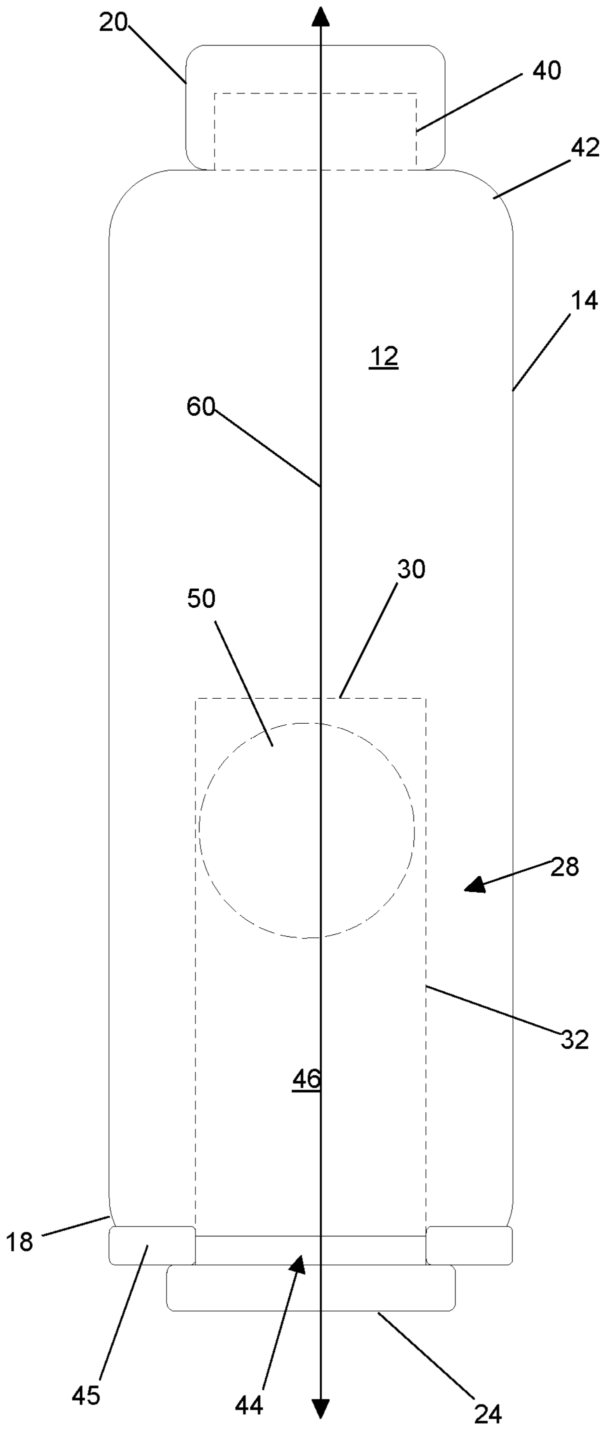
FIG. 7 is a side cross-sectional view of a bottle having an internal mixing compartment in accordance with principles of the invention.

FIG. 7 shows a cross-section of the bottle having an internal mixing compartment 10 along a longitudinal axis 60. The bottle having an internal mixing compartment 12 and the mixing compartment 28 are coaxial, i.e. centered about the longitudinal axis 60. An agitator 50 is located within the mixing compartment chamber 46 and can move freely about within the mixing compartment chamber 46. In this embodiment, the agitator 50 is free-floating. That is, it is not affixed, either directly or by a tether or string, and may therefore move and rotate freely. The agitator 50 is sized to have a diameter or width slightly less than the diameter or width of the mixing compartment chamber 46. Optionally, the agitator 50 may have a width or diameter that is substantially smaller than the width or diameter of the mixing compartment chamber 46.

Figure 8:
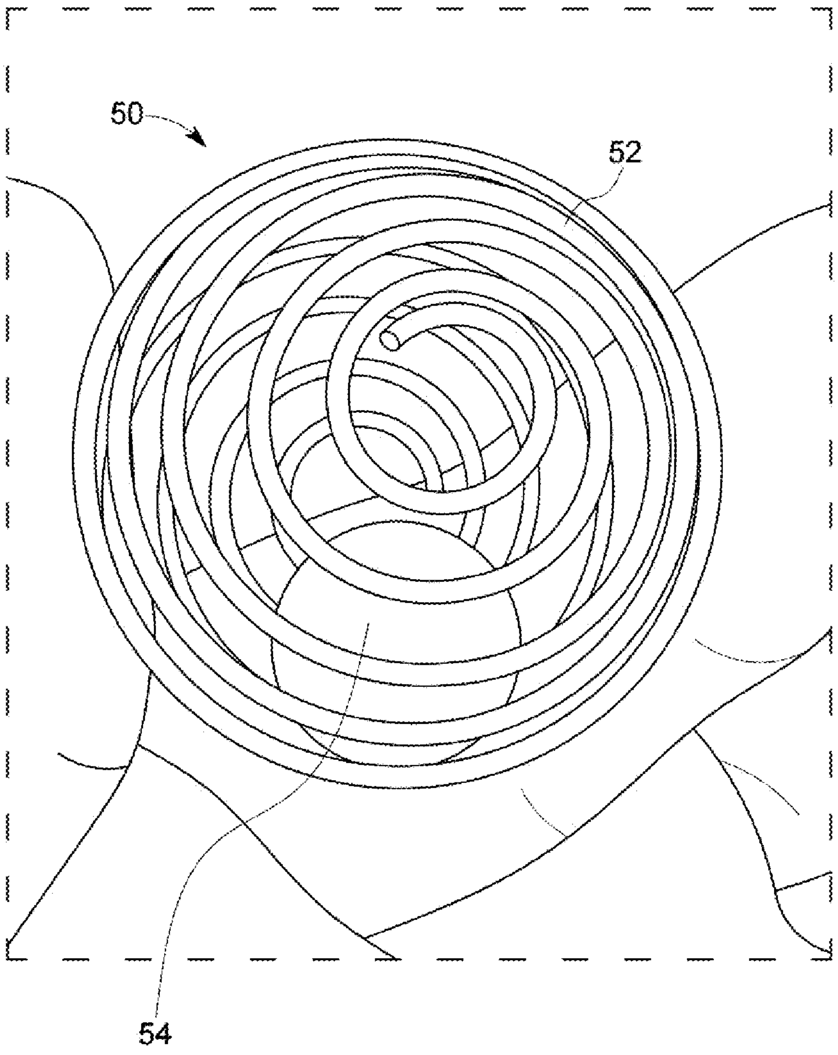
FIG. 8 is a perspective view of an agitator for a bottle having an internal mixing compartment in accordance with principles of the invention.

FIG. 8 shows an agitator 50 in accordance with principles of the invention. The agitator 50 includes an open frame 52 and then internal weighted sphere 54. In this embodiment, the open frame 52 is formed by a single wire in the shape of a spherical helix. The internal weighted sphere 54 is formed from a relatively heavy material and is configured to move around inside the open frame 52 without passing through it.

FIGS. 9-12 illustrate the stages of a method of mixing solid and liquid contents within a bottle having an internal mixing compartment in accordance with principles of the invention utilizing the bottle having an internal mixing compartment 10 shown in FIGS. 1-8.

Figure 9:
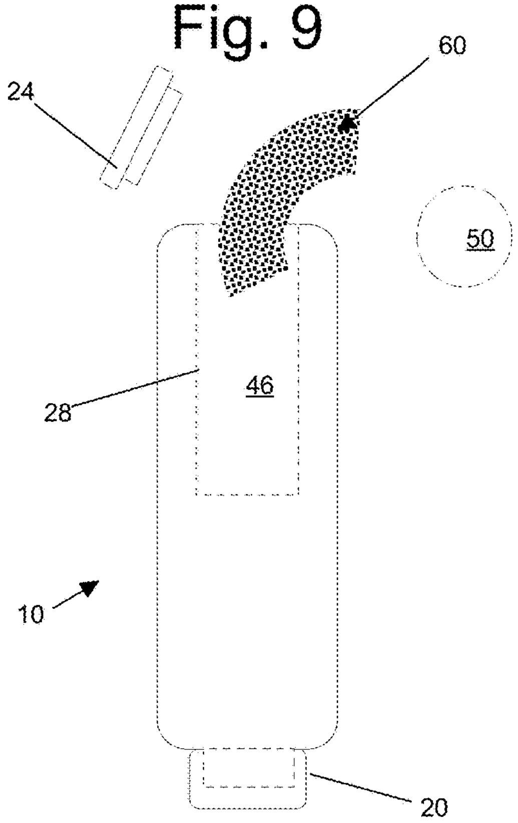
FIG. 9 is a side cross-sectional view of an inverted bottle having an internal mixing compartment with particulate material being added to the mixing compartment in accordance with the principles of the invention.
Figure 10:
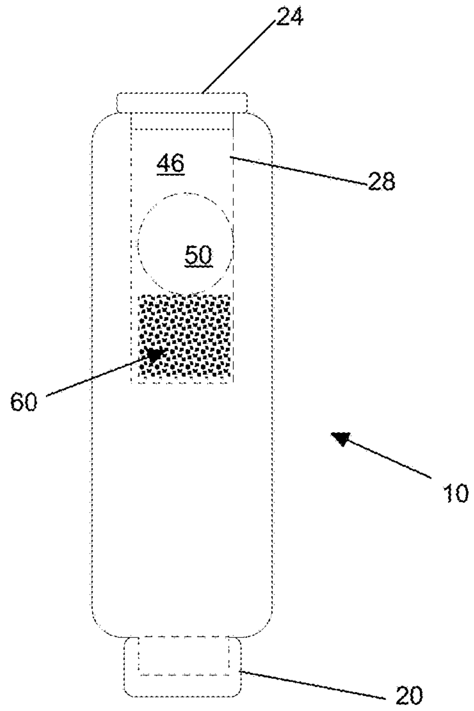
FIG. 10 is a side cross-sectional view of an inverted bottle having an internal mixing compartment with particulate matter and an agitator within the mixing compartment chamber in accordance with principles of the invention.

FIG. 9 illustrates a first step, in which the bottle having an internal mixing compartment 10 is inverted and the bottom lid 24 is removed. The agitator 50 is also removed from the mixing compartment chamber 46. Optionally, the agitator 50 is not removed. A particulate material 60 is poured into the mixing compartment chamber 46. FIG. 10 shows the second step where the agitator 50 is placed back into the mixing compartment chamber and the bottom lid 24 is secured in place to seal the base of the bottle having an internal mixing compartment 12.

Figure 11:
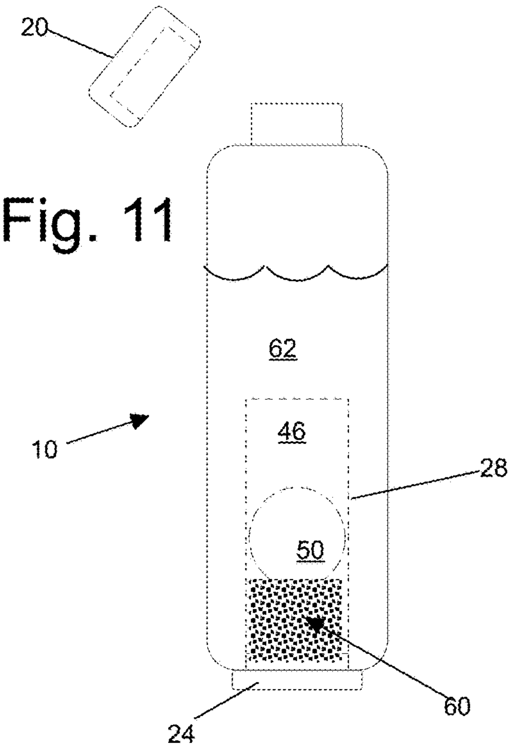
FIG. 11 is a side cross-sectional view of a bottle having an internal mixing compartment having particulate material within the mixing compartment chamber and liquid added to the drinking bottle with the top lid removed in accordance with principles of the invention.

In the next step, shown in FIG. 11, the bottle having an internal mixing compartment 10 is again rotated so that it is in the upright position. The top lid 20 is removed, and a liquid 62 is then poured into the drinking bottle 12 through the opening 38. The drinking bottle 12 is substantially filled. However, it may be desirable to not completely fill the bottle in order to better facilitate mixing. The liquid 62 will also permeate the mixing compartment chamber 46. The top lid 20 is then again secured in place on the top 16 of the drinking bottle 12, and the bottle is shaken repeatedly and vigorously. This causes the particulate material 60 to move about and dispersed within the mixing compartment chamber 46. The agitator 50 increases turbulence and mixing of both the particulate material 60 and the liquid 62, substantially contributing to the mixing of the particulate material 60 with the liquid 62 as it passes through the mixing compartment chamber 46. Optionally, the liquid 62 may be poured into the mixing compartment chamber 46 in the first step shown in FIG. 9. This may be desirable if the agitator 50 is not removed, because addition of the liquid will assist the particulate material 60 in entering the frame of the agitator, and also initiates dissolution of the soluble material.

Figure 12:
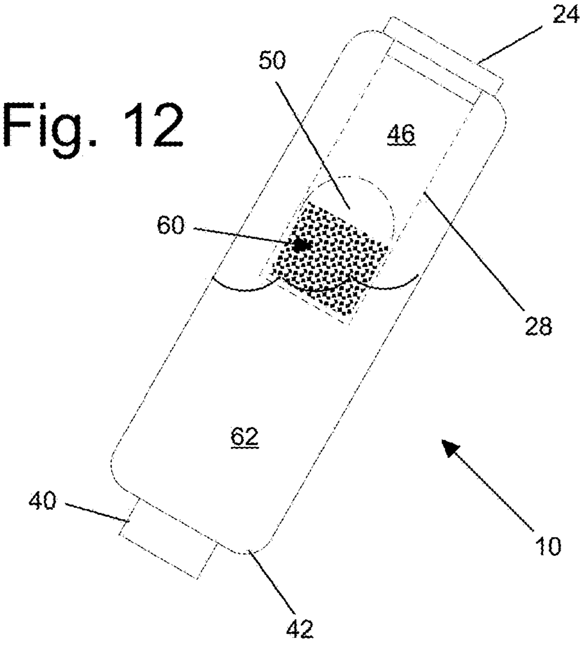
FIG. 12 is a side cross-sectional view of a bottle having an internal mixing compartment tilted into a drinking position in accordance with principles of the invention.

In the last step, shown in FIG. 12, an operator drinks the liquid 62 which now includes the soluble, dissolved constituents of the particulate material 60 through the top opening 38. The mixing compartment 28 prevents any of the insoluble constituents of the particulate matter 60 from exiting through the top opening 38.

Figure 13:
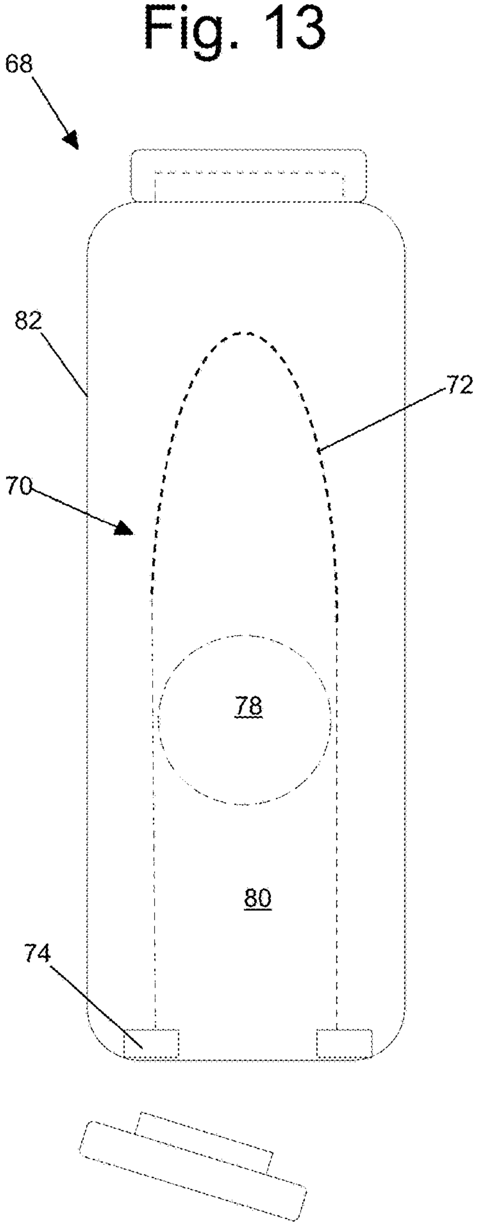
FIG. 13 is a side cross-sectional view of an alternative embodiment of a bottle having an internal mixing compartment in accordance with principles of the invention.

FIG. 13 shows an alternative embodiment of a bottle having an internal mixing compartment 68 in accordance with principles of the invention. In this embodiment, the coaxial mixing compartment 70 has a curved top 72. In addition, the mixing compartment's annular lip 74 extends partially into the base opening 76, thereby preventing the agitator 78 from exiting the mixing compartment chamber 80. The agitator 78 may optionally be somewhat flexible, thereby allowing it to be removed from the mixing compartment chamber, but only when force is applied to squeeze it through the annular lip 74. The annular lips may still be detachable from the bottle having an internal mixing compartment 82. This embodiment retains the agitator 78 within the mixing compartment chamber, preventing it from being misplaced or accidentally dropped to the ground.

Figure 14:
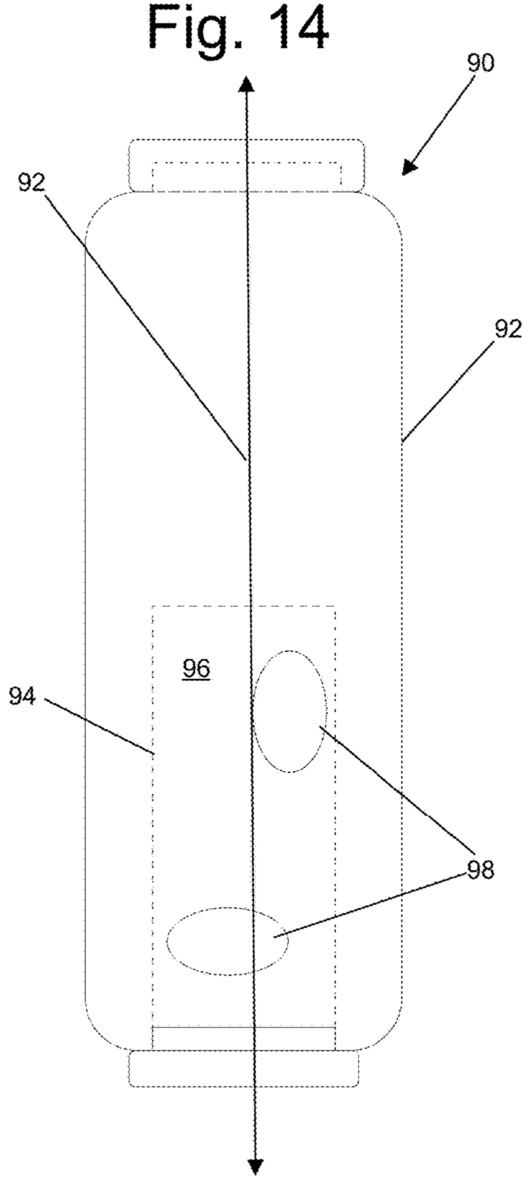
FIG. 14 is a cross-sectional view of another alternative embodiment of a bottle having an internal mixing compartment in accordance with the principles of the invention.
Figure 15:
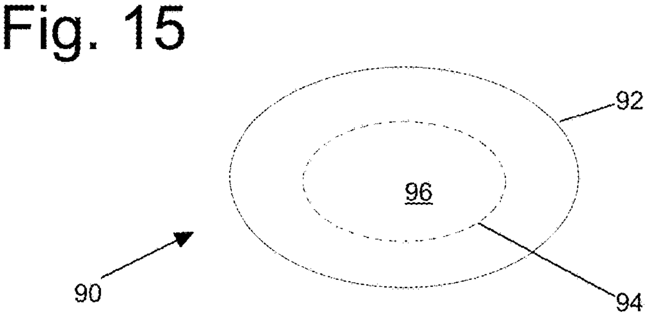
FIG. 15 is a transverse cross-sectional view of an alternative embodiment of a bottle having an internal mixing compartment accordance with principles of the invention.

FIGS. 14 and 15 shows another alternative embodiment of a bottle having an internal mixing compartment 90 in accordance with principles of the invention. In this embodiment, both the drinking bottle 92 and the mixing compartment 94 having elliptical, not circular, cross-sections, and are still coaxial along a longitudinal axis 91. In addition, the mixing compartment chamber 96 includes two separate agitators 98. The use of two agitators instead of one may enhance and better facilitate mixing of particulate matter with a liquid. The agitators of this embodiment are comprised of solid, weighted elliptical objects which are substantially heavier than a commonly with or particulate matter. This embodiment illustrates that the bottle having an internal mixing compartment, mixing compartment and agitators need not be radially symmetric or have any particular shape. A plurality of agitators may also be used.

Whereas, the present invention has been described in relation to the drawings attached hereto, other and further modifications, apart from those shown or suggested herein, may be made within the spirit and scope of this invention. Those skilled in the art will appreciate that the conception, upon which this disclosure is based, may readily be utilized as a basis for the designing of other structures, methods and systems for carrying out the several purposes of the present invention. Descriptions of the embodiments shown in the drawings should not be construed as limiting or defining the ordinary and plain meanings of the terms of the claims unless such is explicitly indicated. The claims should be regarded as including such equivalent constructions insofar as they do not depart from the spirit and scope of the present invention.

The invention claimed is:

1. A portable drinking bottle comprising:

a a sidewall extending from a base to a top, an opening in the top, and a removable upper lid sealing the opening;

an internal mixing compartment defined by a cylindrical, rigid screen mesh sidewall extending into the bottle from the base of the bottle to a mixing compartment top, the internal mixing compartment having a cross-sectional area less than a cross-sectional area of the bottle defined by the sidewall;

an opening in the base providing access to the internal mixing compartment;

a removable bottom lid sealing the opening to the mixing compartment in the base of the bottle; and, at least one agitator in the mixing compartment.

2. The portable bottle of claim 1 wherein the internal mixing compartment is removable from the bottom through the opening in the base of the bottle.

3. The portable bottle of claim 2 wherein the drinking bottle and the mixing compartment are both substantially cylindrical and are coaxially aligned about a longitudinal axis.

4. The portable bottle of claim 3 wherein the at least one agitator is a free floating agitator.

5. The portable bottle of claim 4 wherein the at least one agitator is removable from the mixing compartment and is sized to fit through the opening in the base of the bottle.

6. The portable bottle of claim 4 wherein an annular lip around the opening in the base of the drinking bottle prevents the agitator from exiting the mixing compartment chamber.

7. The portable bottle of claim 5 wherein the at least one agitator comprises a spherical frame surrounding an internal weighted sphere.

8. The portable bottle of claim 7 wherein a width of the at least one agitator is substantially equal to a width of the mixing compartment.

9. The portable bottle of claim 5 wherein the at least one agitator has an ellipsoidal shape.

* * * * *